United States Patent
Kamei et al.

(10) Patent No.: US 10,210,444 B2
(45) Date of Patent: Feb. 19, 2019

(54) COOKING ASSISTANCE METHOD AND COOKING APPARATUS

(71) Applicant: Panasonic Intellectual Property Corporation of America, Torrance, CA (US)

(72) Inventors: Rinako Kamei, Osaka (JP); Yasuhiro Yuki, Kanagawa (JP); Hiroyuki Kubotani, Hyogo (JP); Kazuki Funase, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 302 days.

(21) Appl. No.: 15/184,987

(22) Filed: Jun. 16, 2016

(65) Prior Publication Data

US 2017/0006669 A1   Jan. 5, 2017

(30) Foreign Application Priority Data

Jun. 30, 2015   (JP) .................................. 2015-131098
Mar. 18, 2016   (JP) .................................. 2016-055043

(51) Int. Cl.
   *G06K 19/06*   (2006.01)
   *H05B 6/64*   (2006.01)

(52) U.S. Cl.
   CPC ..... *G06K 19/06037* (2013.01); *H05B 6/6441* (2013.01)

(58) Field of Classification Search
   CPC ... H05B 6/68; H05B 6/66; H05B 6/64; G06Q 50/00; G06Q 10/08; G06Q 30/06
   USPC ...... 219/488, 711, 702, 707; 705/15, 16, 22, 705/26.8, 28, 319
   See application file for complete search history.

(56) References Cited

U.S. PATENT DOCUMENTS

| | | | |
|---|---|---|---|
| 6,298,331 B1* | 10/2001 | Walker | G06Q 10/087 705/15 |
| 2003/0079613 A1* | 5/2003 | Williamson | A47J 31/52 99/282 |
| 2009/0181131 A1* | 7/2009 | Forbes-Roberts | G06Q 30/0601 426/106 |
| 2010/0320189 A1* | 12/2010 | Buchheit | H05B 6/6441 219/488 |
| 2014/0297467 A1* | 10/2014 | Soller | G06Q 50/01 705/26.8 |
| 2014/0365345 A1* | 12/2014 | Isogai | G06Q 30/0601 705/28 |

(Continued)

FOREIGN PATENT DOCUMENTS

JP   2008-287904   11/2008

*Primary Examiner* — Olusegun Goyea
(74) *Attorney, Agent, or Firm* — Greenblum & Bernstein, P.L.C.

(57) ABSTRACT

A cooking assistance method includes: receiving, from a first food, first food information indicating the first food; receiving appliance identification information for identifying the cooking apparatus for cooking the first food; obtaining first setting details regarding cooking to be performed by the cooking apparatus, based on the received first food information and the received appliance identification information, the first setting details being associated with the first food and the cooking apparatus; and transmitting first setting information indicating the obtained first setting details to the cooking apparatus.

18 Claims, 11 Drawing Sheets

(56) References Cited

U.S. PATENT DOCUMENTS

| | | | | |
|---|---|---|---|---|
| 2015/0289324 A1* | 10/2015 | Rober | ................... | H05B 6/68 219/711 |
| 2015/0305564 A1* | 10/2015 | Jimenez | ............... | A47J 43/046 366/141 |
| 2017/0161290 A1* | 6/2017 | Kuroyama | ............ | G06Q 10/00 |

* cited by examiner

FIG. 8

| FOOD CODE | FOOD NAME | FOOD IMAGE |
|---|---|---|
| 000000001234 | NOODLES FOR MICROWAVE COOKING | Noodles |
| 000000001371 | LOW-FAT BUTTER | Low-Fat Butter |
| ... | ... | ... |

COOKING ASSISTANCE METHOD AND COOKING APPARATUS

BACKGROUND

1. Technical Field

The present disclosure relates to a cooking assistance method for assisting cooking and a cooking apparatus for cooking food.

2. Description of the Related Art

In recent years, foods that can be easily cooked with microwave ovens have been developed, such as frozen foods and chilled foods. For such foods, the cooking method varies from one product to another, and it is necessary to set an optimum heating temperature and an optimum heating time. There are optimum placement positions for foods in the heating chamber in each microwave oven. When a food is placed at a position displaced from the optimum placement position, there is a possibility that the food is not properly heated.

For example, according to Japanese Unexamined Patent Application Publication No. 2008-287904 (hereinafter referred to as "Patent Document 1"), for controlling a heating distribution by using the directions of rotary antennas, a place that opposes the rotary antennas is indicated by markings 19a and 19b as a place where food is to be placed. Thus, the place where the food is to be placed can be clarified, and it is possible to direct a user's attention so that he or she places the food in only the area that can be reliably irradiated with a microwave.

However, the technique disclosed in Patent Document 1 requires further improvements.

SUMMARY

In one general aspect, the techniques disclosed here feature a cooking assistance method for a cooking assistance system that includes a processor and that is connected through a network to a cooking apparatus for cooking food. The cooking assistance method includes: receiving, from a first food, first food information indicating the first food; receiving appliance identification information for identifying the cooking apparatus for cooking the first food; obtaining first setting details regarding cooking to be performed by the cooking apparatus, based on the received first food information and the received appliance identification information, the first setting details being associated with the first food and the cooking apparatus; and transmitting first setting information indicating the obtained first setting details to the cooking apparatus.

According to the present disclosure, it is possible to easily and reliably realize cooking setting corresponding to a food.

It should be noted that general or specific embodiments may be implemented using a system, a method, a computer program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 illustrates one example of food images stored in a purchase history DB;

DETAILED DESCRIPTION

Knowledge Underlying the Present Disclosure

Figure 1:
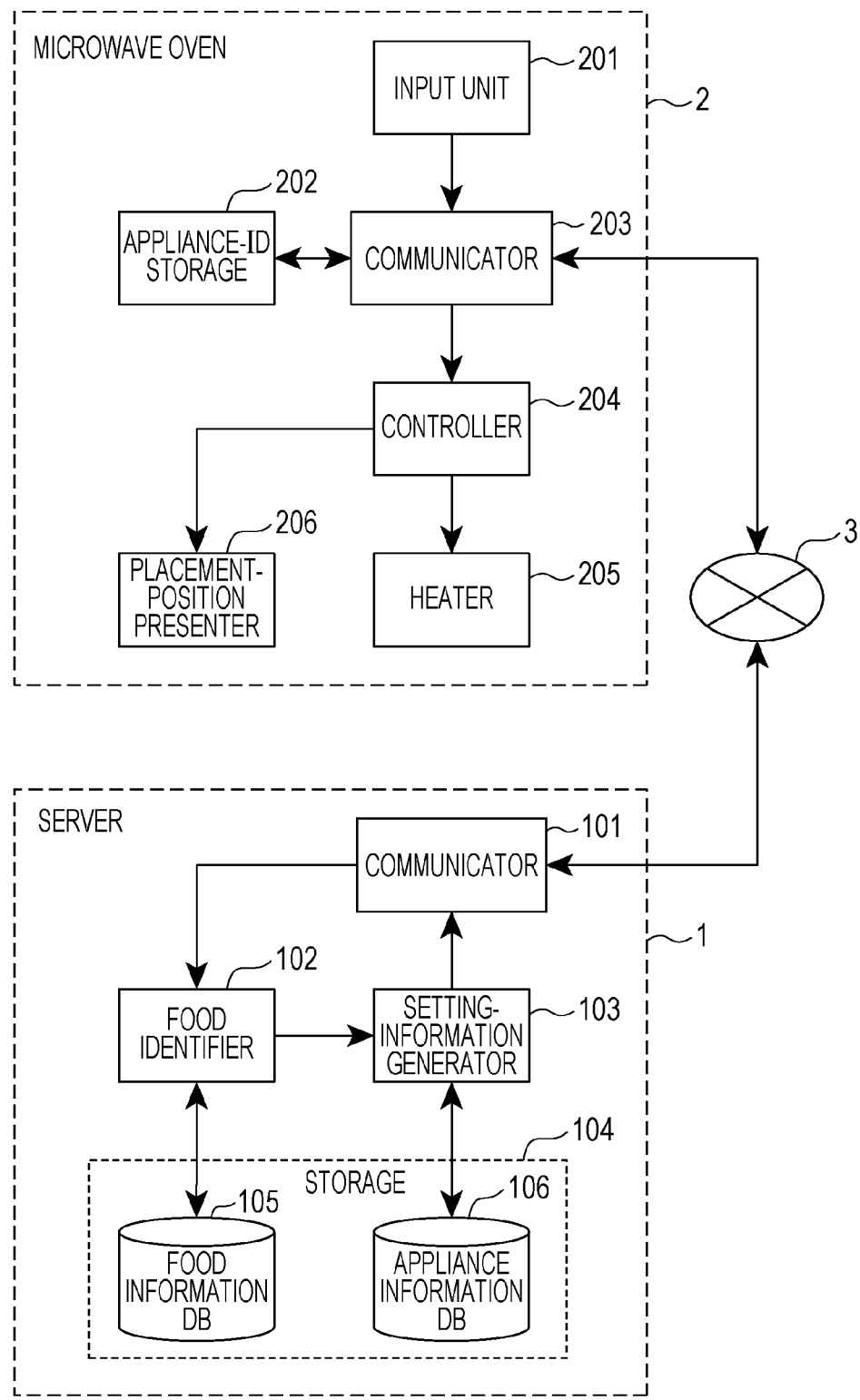
FIG. 1 is a diagram illustrating the configuration of a cooking assistance system according to a first embodiment of the present disclosure.

In order to set an optimum cooking method corresponding to the type of food for a home microwave oven or the like, fine setting needs to be performed according to the type of microwave oven owned by a user, and this is quite burdensome for the user. Also, even if an optimum cooking method is set, optimum cooking as intended cannot be realized unless a food is placed at an optimum position in the microwave oven.

In Patent Document 1, the place where an object to be heated on a placement table is guided with markings. However, the markings in Patent Document 1 guide the placement position on the basis of constrains of the appliance and do not guide the optimum placement position on the basis of constrains of food.

Accordingly, the present inventor has studied the following measures for improvement.

(1) A cooking assistance method according to one aspect of the present disclosure is directed to a cooking assistance method for a cooking assistance system that includes a processor and that is connected through a network to a cooking apparatus for cooking food. The cooking assistance method includes: receiving, from a first food, first food information indicating the first food; receiving appliance identification information for identifying the cooking apparatus for cooking the first food; obtaining first setting details regarding cooking to be performed by the cooking apparatus, based on the received first food information and the received appliance identification information, the first setting details being associated with the first food and the cooking apparatus; and transmitting first setting information indicating the obtained first setting details to the cooking apparatus.

According to this configuration, the food information obtained from a food to be used in a cooking apparatus, which cooks the food, and the appliance identification information for identifying the cooking apparatus are received. Based on the received food information, the food is uniquely identified. Cooking setting details of the cooking apparatus which are associated with the identified food and the received appliance identification information are obtained, and the setting information indicating the obtained cooking setting details is transmitted to the cooking apparatus.

That is, the food is uniquely identified based on the food information obtained from the food to be used in the cooking apparatus, the cooking setting details of the cooking apparatus which are associated with the identified food and the appliance identification information are obtained, and the setting information indicating the obtained cooking setting details is transmitted to the cooking apparatus. Thus, by using the setting information to perform cooking setting for the food, the cooking apparatus can easily and reliably realize cooking setting corresponding to the food.

(2) In the above-described aspect, the first food may include a processed food. According to this configuration, the processed food is uniquely identified based on the food information obtained from the processed food to be used in the cooking apparatus, the cooking setting details of the cooking apparatus which are associated with the identified processed food and the appliance identification information are obtained, and the setting information indicating the obtained cooking setting details is transmitted to the cooking apparatus. Thus, by using the setting information to perform cooking setting for the processed food, the cooking apparatus can easily and reliably realize cooking setting corresponding to the processed food.

(3) In the above-described aspect, the cooking apparatus may include a microwave oven, the first setting information may include information regarding a placement position of the first food in a heating chamber in the microwave oven, and the cooking assistance method may further include presenting the placement position of the first food to a user, based on the information regarding the placement position.

According to this configuration, the cooking apparatus includes a microwave oven; the setting information includes information regarding the placement position of the food in the heating chamber in the microwave oven; and based on the information regarding the placement position, the placement position of the food is presented to the user. Thus, an optimum placement position of the food in the heating chamber in the microwave oven can be presented to the user, and when the user places the food at the presented placement position, the food can be cooked properly.

(4) In the above-described aspect, a light emitter may be disposed in the heating chamber in the microwave oven to emit light to present the placement position to the user.

(5) In the above-described aspect, the first setting information may include information regarding a heating intensity for the microwave oven.

According to this configuration, since the setting information includes the information regarding the heating intensity for the microwave oven, a heating intensity that is optimum for the food can be automatically set, thus making it possible to eliminate or reduce the user's burden.

(6) In the above-described aspect, the cooking assistance system may be further connected to a device configured to read information indicated by barcodes, and the device may read a barcode attached to the first food.

According to this configuration, since the device reads the barcode attached to the food to thereby obtain the food information, it is possible to easily obtain the food information.

(7) In the above-described aspect, the device may be a two-dimensional-code reading device or a color-code reading device, and the barcode attached to the first food may be a two-dimensional code or a color code.

According to this configuration, since the device reads the two-dimensional code or color code attached to the food to thereby obtain the food information, it is possible to easily obtain the food information.

(8) In the above-described aspect, the first food information may include image information indicating an image obtained by photographing an external appearance of the first food.

According to this configuration, it is possible to easily obtain the food information.

(9) In the above-described aspect, the first food information may include character information indicating a character shown on the first food.

According to this configuration, it is possible to easily obtain the food information.

(10) In the above-described aspect, the cooking assistance system may be further connected through the network to a point-of-sale device installed at a store that sells one or more foods, and the first food information may be obtained by the point-of-sale device when the first food is purchased, and may be received from the point-of-sale device through the network.

According to this configuration, the point-of-sale device installed at the store that sells one or more foods obtains, at the time of purchase of one or more foods, food identification information for uniquely identifying the one or more foods; and the food identification information and user-identification information for identifying a user who purchased the one or more foods are received from the point-of-sale device. The received food identification information and the user-identification information are stored in a purchase history database in association with each other.

That is, at the time of purchase of one or more foods, the food identification information for uniquely identifying the one or more foods and the user-identification information are stored in the purchase history database in association with each other, and thus, the food purchased by the user can be managed as a purchase history.

(11) In the above-described aspect, the cooking assistance system may further include a display and a memory that stores a food list including the one or more foods. The cooking assistance method may further include: displaying the food list on the display; receiving second food information indicating a second food that the user selected from the displayed food list; determining whether or not the received second food information and the first food information match; obtaining the first setting details when it is determined that the first food information and the second food information match; obtaining second setting details regarding cooking performed by the cooking apparatus, when it is determined that the first food information and the second food information do not match, the second setting details being associated with the second food and the appliance identification information; and transmitting second setting information indicating the obtained second setting details to the cooking apparatus.

According to this configuration, a food list request for requesting the food list, which is a list of foods purchased by the user, and the user-identification information for identifying the user are received. The food identification information corresponding to the user-identification information is obtained from the purchase history database, and the food list is generated based on the obtained food identification information. The generated food list is then transmitted to a source that transmitted the food list request.

Thus, since the food list, which is a list of foods purchased by the user, is generated, and the generated food list is transmitted to a source that transmitted the food list request, the food list can be presented to the user, and the user can easily select a food to be cooked from the food list.

(12) In the above-described aspect, the memory may further store a table in which the first food is associated with the first food information and the second food is associated with the second food information, and the cooking assistance method may further include correcting the first food associated with the first food information in the table to the second food, when it is determined that the first food information and the second food information do not match.

According to this configuration, food selection information indicating a food that the user selected from the displayed food list and the appliance identification information are received. The cooking setting details of the cooking apparatus which are associated with the food indicated by the received food selection information and the received appliance identification information are obtained.

Thus, it is possible to reliably execute cooking setting corresponding to the food selected by the user.

(13) In the above-described aspect, the cooking assistance method may further include: receiving, from a second food, second food information indicating the second food, in conjunction with the first food information; obtaining second setting details regarding cooking to be performed by the cooking apparatus, based on the received second food information and the received appliance identification information, the second setting details being associated with the second food and the cooking apparatus; and transmitting second setting information indicating the second setting details to the cooking apparatus, in conjunction with the first setting information.

According to this configuration, food selection information indicating a food that the user selected from the displayed food list and the appliance identification information are received. A determination is made as to whether or not the food indicated by the received food selection information and the identified food match each other. When it is determined that both the foods match each other, the cooking setting details of the cooking apparatus which are associated with the identified food and the received appliance identification information are obtained. When it is determined that both the foods do not match each other, the cooking setting details of the cooking apparatus which are associated with the food indicated by the received food selection information and the received appliance identification information are obtained.

Accordingly, when the food uniquely identified based on the food information and the food that the user selected from the food list differ from each other, the food selected by the user is correct, and thus the cooking setting details of the cooking apparatus which are associated with the food indicated by the food selection information and the appliance identification information are obtained. This makes it possible to reliably obtain the cooking setting details of the cooking apparatus.

(14) In the above-described aspect, the cooking apparatus may include a microwave oven, the first setting information may include first information regarding a first placement position of the first food in a heating chamber in the microwave oven, the second setting information may include second information regarding a second placement position of the second food in the heating chamber in the microwave oven, and the cooking assistance method may further include presenting the first placement position and the second placement position to the user, based on the first information regarding the first placement position and the second information regarding the second placement position.

According to this configuration, a table in which the food information and unique foods are associated with each other is referred to, and a food associated with the received food information is uniquely identified. When the food uniquely identified based on the food information and the food that the user selected from the food list do not match each other, the food associated with the food information in the table is modified to the food indicated by the received food selection information. This makes it possible to correct an error in the table in which the food information and the unique foods are associated with each other and makes it possible to improve the accuracy of identifying a food.

(15) In the above-described aspect, the cooking apparatus may include a microwave oven, the first setting information may include information indicating a first heating time for the first food in a heating chamber in the microwave oven, the second setting information may include information indicating a second heating time for the second food in the heating chamber in the microwave oven, and when the first setting information is compared with the second setting information, and it is determined that the first heating time is shorter than the second heating time, the first setting information and the second setting information may include notification information for prompting placement of the first food into the cooking apparatus during cooking of the second food performed by the first cooking apparatus.

According to this configuration, the food includes the first food and second food different from the first food. When the first food information obtained from the first food is received, and then second food information obtained from the second food is received before the cooking of the first food is started, the first food is uniquely identified based on the received first food information, and the second food is uniquely identified based on the received second food information. Then, cooking setting details of the cooking apparatus which are associated with the identified first food, the identified second food, and the received appliance identification information are obtained.

Accordingly, when the first food and the second food are cooked at the same time, it is possible to provide a cooking setting that is optimum for the case in which the first food and the second food are cooked at the same time.

Also, in the above-described cooking assistance method, the cooking apparatus may include a microwave oven; the setting information may include information regarding the respective placement positions of the first food and the second food in the heating chamber in the microwave oven; and based on the information regarding the placement positions, the placement positions of the first food and the second food may be presented to the user.

According to this configuration, the cooking apparatus includes a microwave oven; the setting information includes the information regarding the respective placement positions of the first food and the second food in the heating chamber in the microwave oven; and based on the information regarding the placement positions, the placement positions of the first food and the second food may be presented to the user. Thus, optimum placement positions of the first food and the second food can be presented to the user.

(16) A cooking apparatus according to another aspect of the present disclosure is directed to a cooking apparatus for cooking food. The apparatus includes: a device that obtains, from a food, food information indicating the food; a storage that stores appliance identification information for identifying the cooking apparatus; a transmitter that transmits the obtained food information and the appliance identification information to a server; a receiver that receives setting information from the server, based on the food information and the appliance identification information, the setting information being associated with the food and the cooking apparatus and indicating setting details regarding cooking to be performed by the cooking apparatus; and a controller that controls the cooking apparatus, based on the setting information.

According to this configuration, the food information is obtained from a food. The obtained food information and the appliance identification information for identifying the cooking apparatus, the appliance identification information being read from the storage, are transmitted to the server. The setting information indicating the cooking setting details of the cooking apparatus which are associated with the food uniquely identified based on the food information and the appliance identification information are received from the server. The cooking apparatus is then controlled based on the received setting information.

That is, the food is uniquely identified based on the food information obtained from the food to be used in the cooking apparatus, the cooking setting details of the cooking apparatus which are associated with the identified food and the appliance identification information are obtained, and the setting information indicating the obtained cooking setting details is received. Thus, by using the setting information to perform cooking setting for the food, the cooking apparatus can easily and reliably realize cooking setting corresponding to the food.

Embodiments of the present disclosure will be described below with reference to the accompanying drawings. Each embodiment below is one example of embodying the present disclosure and is not intended to limit the technical scope of the present disclosure.

First Embodiment

FIG. 1 is a diagram illustrating the configuration of a cooking assistance system according to a first embodiment of the present disclosure. The cooking assistance system illustrated in FIG. 1 includes a server 1 and a microwave oven 2. The server 1 and the microwave oven 2 are connected to each other through a network 3 so as to allow communication with each other. The network 3 is, for example, the Internet. The microwave oven 2 is one example of a cooking apparatus for cooking food.

The server 1 includes a communicator 101, a food identifier 102, a setting-information generator 103, and a storage 104. The storage 104 includes a food information database (DB) 105 and an appliance information database (DB) 106.

The communicator 101 transmits various types of information to the microwave oven 2 and also receives various types of information from the microwave oven 2. The communicator 101 receives food information obtained from a food to be used in the microwave oven 2, which assists cooking, and an appliance ID (appliance identification information) for identifying the microwave oven 2.

The food identifier 102 uniquely identifies the food, based on the received food information. The food identifier 102 identifies not only the type of food but also the product name or product number of the food. It is desirable that the food is a processed food.

Pieces of food information and foods (e.g., product names or product numbers thereof) are stored in a tabular form in the food information DB 105 in association with each other. For example, a reading device (a scanner) reads a barcode attached to each food to thereby obtain the food information. In this case, the food information DB 105 stores therein a table in which pieces of barcode information read by the scanner and corresponding foods are associated with each other. The food identifier 102 uniquely identifies each food associated with the corresponding barcode information, based on the food information DB 105.

A reading device (a camera) may read a two-dimensional code or color code attached to each food to thereby obtain the food information. The two-dimensional code is, for example, a QR code (registered trademark). The color code is information represented by an array of colors, such as red, blue, and yellow. In this case, the food information DB 105 stores therein a table in which pieces of two-dimensional code information or color code information read by the camera and corresponding foods are associated with each other. The food identifier 102 uniquely identifies each food associated with the corresponding two-dimensional code information or color code information, based on the food information DB 105.

Also, a reading device (a camera) may capture an image of the package of a food to thereby obtain the food information. In this case, the food information DB 105 stores therein a table in which whole-food images or food package images captured by the camera and corresponding foods are associated with each other. The food identifier 102 performs image recognition to uniquely identify each food associated with the corresponding whole-food image or food package image, based on the food information DB 105. A method for the image recognition is not particularly limiting. It is satisfactory as long as each food can be identified using information such as a shape or color.

The setting-information generator 103 obtains, from the appliance information DB 106, cooking setting details of the microwave oven 2 which are associated with a food identified by the food identifier 102 and the appliance ID received by the communicator 101 and generates setting information indicating the obtained cooking setting details.

Foods, the appliance ID, and the cooking setting details of the microwave oven 2 are stored in a tabular form in the appliance information DB 106 in association with each other. The setting information includes information regarding the placement position of a food in a heating chamber in the microwave oven 2. Based on the information regarding the placement position, the placement position of the food is presented to the user. The setting information may also include information regarding a heating intensity for the microwave oven 2. In addition, the setting information may include information regarding a heating time for the microwave oven 2.

The communicator 101 transmits the setting information generated by the setting-information generator 103 to the microwave oven 2.

The microwave oven 2 includes an input unit 201, an appliance-ID storage 202, a communicator 203, a controller 204, a heater 205, and a placement-position presenter 206.

The input unit 201 obtains the food information from a food. The input unit 201 includes, for example, a barcode scanner to read a barcode attached to a surface (package) of a food and obtains the read barcode information as the food information.

The input unit 201 may include, for example, a camera to read a two-dimensional code or color code attached to a surface (package) of a food and obtains the read two-dimensional code information or color code information as the food information.

The input unit 201 may also include, for example, a camera to capture an image of a surface (package) of a food and may obtain the captured package image as the food information.

The appliance-ID storage 202 stores an appliance ID for identifying the microwave oven 2.

The communicator 203 transmits various types of information to the server 1 and also receives various types of information from the server 1. The communicator 203 transmits, to the server 1, the food information obtained by the input unit 201 and the appliance ID read from the appliance-ID storage 202. The communicator 203 also receives, from the server 1, the setting information indicating the cooking setting details of the microwave oven 2 which are associated with the appliance ID and a food uniquely identified based on the food information.

Based on the setting information received by the communicator 203, the controller 204 controls the microwave oven 2.

The heater 205 includes, for example, a magnetron, which generates microwaves to heat a food placed in the heating chamber. The controller 204 controls the heating intensity and the heating time for the heater 205, based on the setting information.

The placement-position presenter 206 includes, for example, a light emitter disposed in the heating chamber in the microwave oven 2. By emitting light, the placement-position presenter 206 presents the position of a food to be placed in the heating chamber to a user. For example, a plurality of light emitters, such as light-emitting diodes (LEDs), is embedded in a top surface of the heating chamber in the microwave oven 2 to illuminate the placement position at a bottom surface of the heating chamber. Based on the setting information, the controller 204 controls the light emission of the placement-position presenter 206.

Next, a description will be given of the operation of the cooking assistance system according to the first embodiment of the present disclosure.

Figure 2:
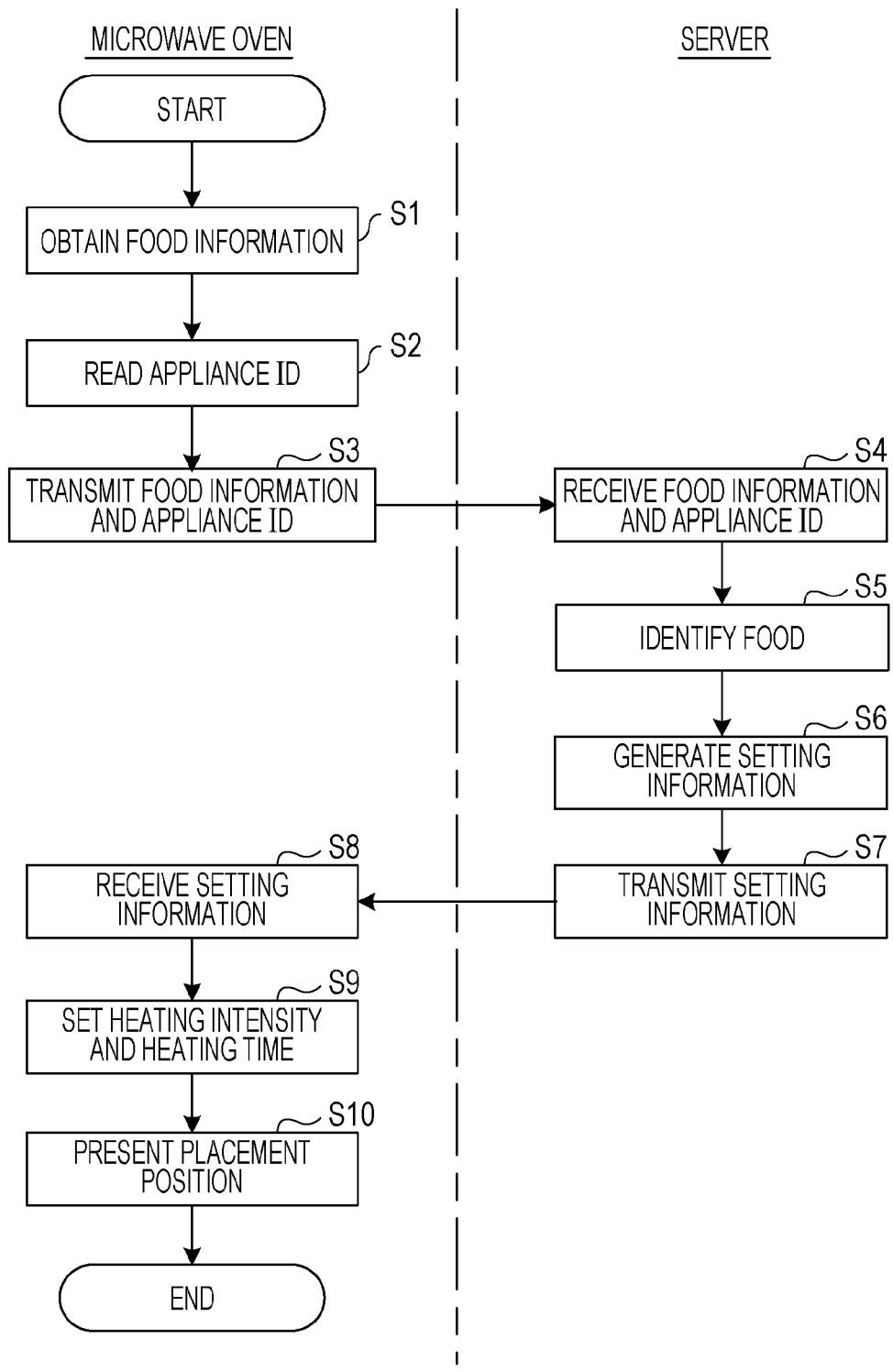
FIG. 2 is a flowchart illustrating the operation of the cooking assistance system according to the first embodiment of the present disclosure.

FIG. 2 is a flowchart illustrating the operation of the cooking assistance system according to the first embodiment of the present disclosure.

First, in step S1, the input unit 201 in the microwave oven 2 obtains food information. As described above, the input unit 201 may obtain the food information (barcode information) by reading a barcode attached to a surface of a food. The input unit 201 may also obtain the food information (two-dimensional code information) by reading a two-dimensional code attached to a surface of a food. The input unit 201 may also obtain the food information (a whole-food image or a food package image) by capturing an image of the food (the whole food or a food package).

Next, in step S2, the communicator 203 reads the appliance ID from the appliance-ID storage 202.

Next, in step S3, the communicator 203 transmits, to the server 1, the food information obtained by the input unit 201 and the appliance ID read from the appliance-ID storage 202.

Next, in step S4, the communicator 101 in the server 1 receives the food information and appliance ID transmitted by the microwave oven 2.

Next, in step S5, based on the food information received by the communicator 101, the food identifier 102 uniquely identifies a food to be used in the microwave oven 2. During the identification, the food identifier 102 refers to the food information DB 105 to uniquely identify a food associated with the food information.

Next, in step S6, the setting-information generator 103 obtains, from the appliance information DB 106, cooking setting details of the microwave oven 2 which are associated with the food identified by the food identifier 102 and the appliance ID received by the communicator 101 and generates setting information indicating the obtained cooking setting details. The setting information in this case includes a heating intensity and a heating time when the microwave oven 2 heats the food and the food placement position in the heating chamber in the microwave oven 2. For example, the bottom surface of the heating chamber in the microwave oven 2 is virtually divided into a plurality of areas, and the placement position indicates, of the virtually divided areas, the area in which the food is placed.

Next, in step S7, the communicator 101 transmits the setting information generated by the setting-information generator 103 to the microwave oven 2.

Next, in step S8, the communicator 203 in the microwave oven 2 receives the setting information transmitted by the server 1.

Next, in step S9, based on the setting information received by the communicator 203, the controller 204 sets the heating intensity and the heating time for the heater 205.

Next, in step S10, based on the setting information received by the communicator 203, the controller 204 controls the light emission of the placement-position presenter 206 to present the food placement position to the user. The bottom surface of the heating chamber in the microwave oven 2 is virtually divided into a plurality of areas, and the setting information indicates in which of the areas the food is placed. The top surface of the heating chamber in the microwave oven 2 has light emitters, which illuminate the respective virtually divided areas. Based on the setting information, the controller 204 identifies the area in which the food is to be placed among the divided areas. The controller 204 then identifies, of the light emitters, the light emitter(s) that is (are) to illuminate the identified area, and controls the light emission of the identified light emitter. Thereafter, when the food is placed at the presented placement position, and a start button is pressed, the food is heated with the set heating intensity for the set heating time.

Figure 3:
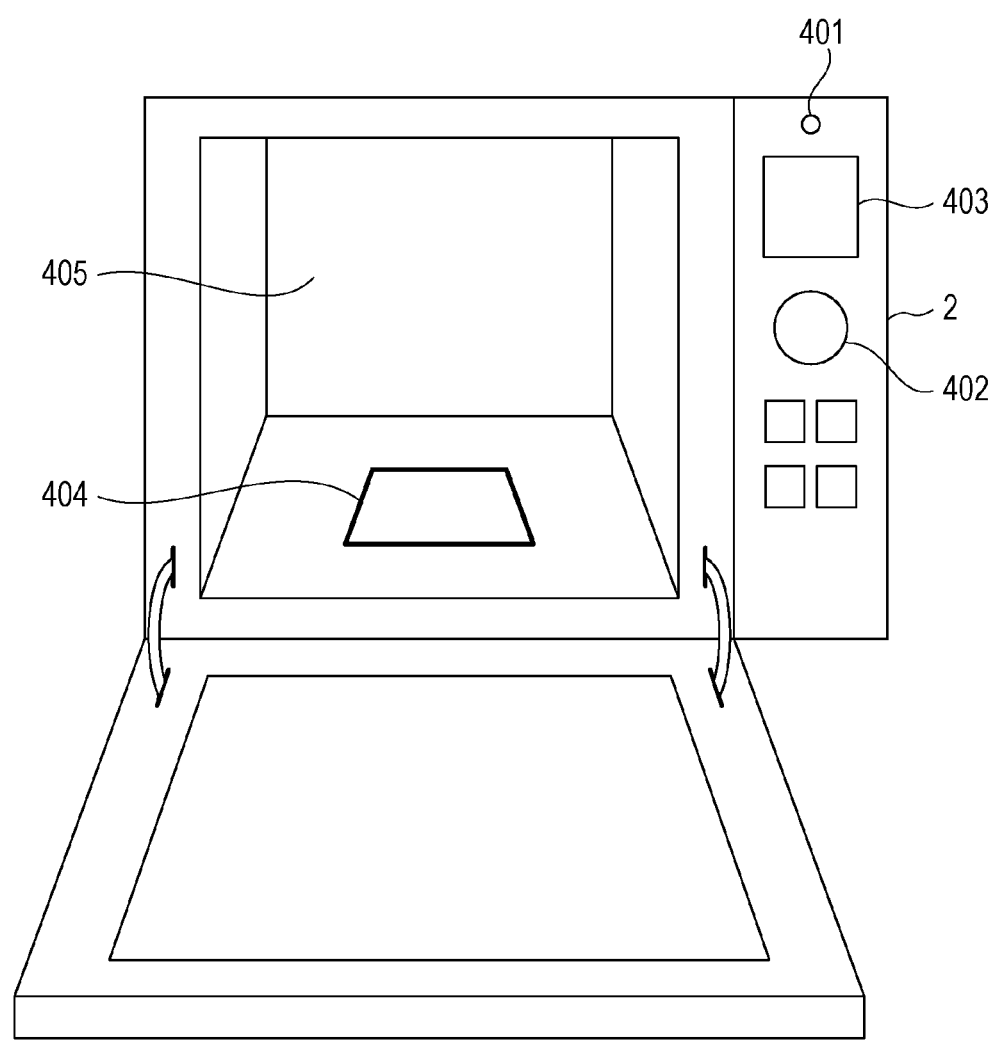
FIG. 3 is a view for describing a food placement position to be presented to a user.

FIG. 3 is a view for describing a food placement position to be presented to the user.

A camera 401 and a start button 402 are arranged on a front surface of the microwave oven 2 illustrated in FIG. 3. The camera 401 reads a barcode or two-dimensional code attached to a food. The start button 402 is a button for starting heating. The microwave oven 2 may have a display unit 403 that displays various types of information. The display unit 403 in this case may be implemented by, for example, a display.

Light emitters (not illustrated) are arranged in a top surface of a heating chamber 405. The light emitters illuminate the food placement position on a bottom surface of the heating chamber 405. In the bottom surface of the heating chamber 405, a guide mark 404 indicating the optimum placement position of a food is formed by light from the light emitters. The shape of the guide mark 404 is, for example, a quadrangular shape, and the shape of the guide mark 404 in the present disclosure is not particularly limited thereto and may be another shape, such as a circular shape. The user places place the food according to the guide mark 404.

In the present embodiment, the setting information may include information regarding the shape of the guide mark 404. The guide mark 404 may have a shape corresponding to the shape of a food, particularly, a shape corresponding to the shape of a bottom surface of a food. For example, when the food has a rectangular-columnar shape, it is desirable that the shape of the guide mark 404 be a quadrangular shape, and when the food has a circular cylindrical shape, it is desirable that the shape of the guide mark 404 have a circular shape. Based on the setting information, the controller 204 controls the shape of the guide mark 404 (the shape of the light to be emitted).

In the present embodiment, the setting information may include information regarding the size of the guide mark 404. The guide mark 404 may have a size corresponding to the size of a food, particularly, a size corresponding to the size of a bottom surface of a food. Based on the setting information, the controller 204 controls the size of the guide mark 404 (the shape of the light to be emitted).

Although, in the present embodiment, the light emitters are arranged in the top surface of the heating chamber, the present disclosure is not particularly limited thereto, and the light emitters may be arranged in the bottom surface of the heating chamber. In this case, the light emitters are embedded in the bottom surface of the heating chamber, and of the light emitters, the light emitter(s) corresponding to the placement position is (are) made to emit light.

Modification of First Embodiment

Although an example in which one food is heated is described in the present embodiment, a plurality of foods may be heated at the same time. Now, a description will be given of an example in which the microwave oven 2 heats a first food and a second food different from the first food. Descriptions that are the same as or similar to those in the first embodiment are not given hereinafter.

In this case, upon receiving second food information obtained from the second food before the cooking of the first food is started (i.e., before the start button is pressed), the food identifier 102 uniquely identifies the first food, based on the received first food information, and also uniquely identifies the second food, based on the received second food information. The setting-information generator 103 obtains cooking setting details of the microwave oven 2 which are associated with the first food identified by the food identifier 102, the second food identified by the food identifier 102, and a received appliance ID and generates setting information indicating the obtained cooking setting details.

The setting information includes information regarding the respective placement positions of the first food and the second food in the heating chamber in the microwave oven 2. The setting information also includes information regarding the heating intensity and the heating time for each of the first food and the second food. Based on the information regarding the placement positions, the placement positions of the first food and the second food are presented to the user.

Figure 10:
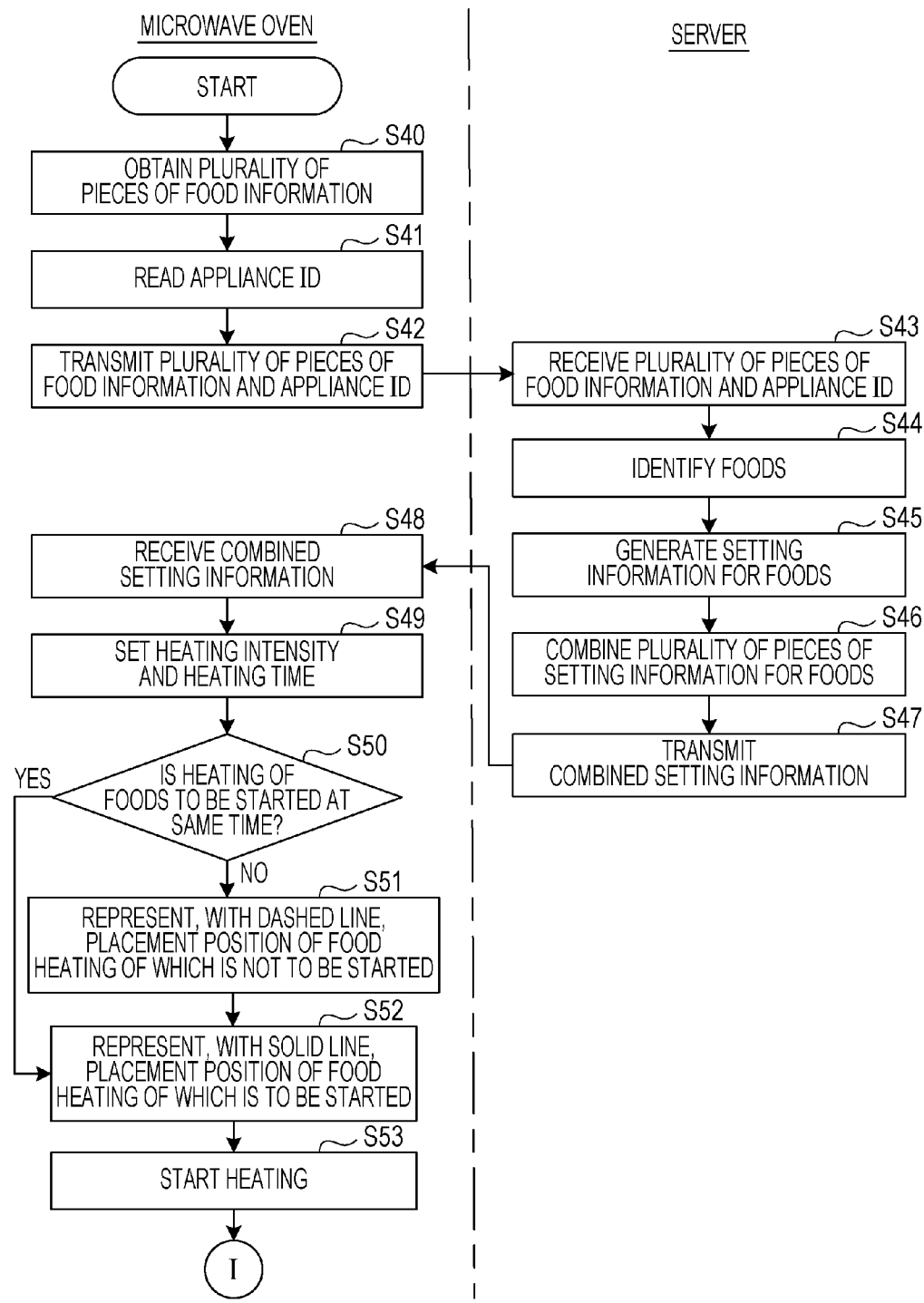
FIG. 10 is a flowchart (1/2) illustrating an operation of the cooking assistance system according to a modification of the first embodiment.
Figure 11:
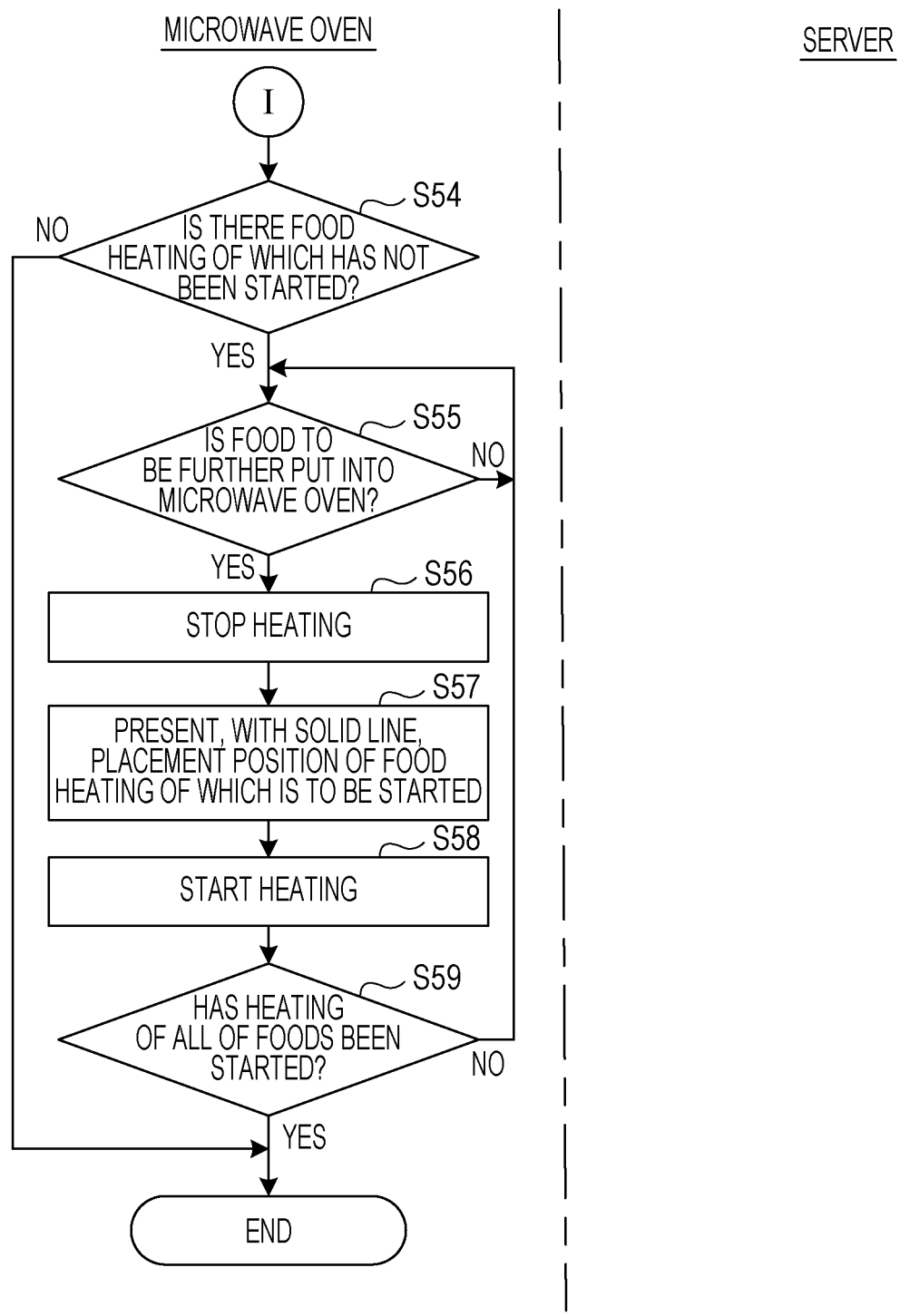
FIG. 11 is a flowchart (2/2) illustrating the operation of the cooking assistance system according to the modification of the first embodiment.

FIGS. 10 and 11 are flowcharts illustrating an operation of the cooking assistance system according to a modification of the first embodiment.

First, in step S40, the input unit 201 in the microwave oven 2 obtains a plurality of pieces of food information.

Next, in step S41, the communicator 203 reads the appliance ID from the appliance-ID storage 202.

Next, in step S42, the communicator 203 transmits, to the server 1, the plurality of pieces of food information obtained by the input unit 201 and the appliance ID read from the appliance-ID storage 202.

Next, in step S43, the communicator 101 in the server 1 receives the plurality of pieces of food information and appliance ID transmitted by the microwave oven 2.

Next, in step S44, based on the plurality of pieces of food information received by the communicator 101, the food identifier 102 uniquely identifies a plurality of foods to be used in the microwave oven 2. In this case, the food identifier 102 refers to the food information DB 105 to uniquely identify the foods associated with the plurality of pieces of food information.

Next, in step S45, the setting-information generator 103 obtains, from the appliance information DB 106, cooking setting details of the microwave oven 2 which are associated with the foods identified by the food identifier 102 and the appliance ID received by the communicator 101 and generates setting information indicating the obtained cooking setting details. In this modification, since a plurality of foods is identified, a plurality of pieces of setting information for the plurality of foods is generated.

Next, in step S46, the setting-information generator 103 combines the plurality of pieces of setting information generated in step S45 to generate combined setting information. The generation of the combined setting information is described later.

Next, in step S47, the communicator 101 transmits the combined setting information generated by the setting-information generator 103 to the microwave oven 2.

Next, in step S48, the communicator 203 in the microwave oven 2 receives the combined setting information transmitted by the server 1.

Next, in step S49, based on the combined setting information received by the communicator 203, the controller 204 sets a heating intensity and a heating time for the heater 205.

Next, in step S50, based on the combined setting information received by the communicator 203, the controller 204 determines whether or not heating of the foods is to be started at the same time. If it is determined that the foods are to be heated at the same time (YES in step S50), the process proceeds to step S52. In step S52, based on the combined setting information received by the communicator 203, the controller 204 controls light emission of the placement-position presenter 206 to present the placement positions of the foods to the user.

If it is determined that the foods are not to be heated at the same time (i.e., the foods are to be heated at different timings) (NO in step S50), the controller 204 presents the placement positions of the foods to the user in steps S51 and S52. In this case, the controller 204 may use different methods for presenting, to the user, the placement position of the food the heating of which is to be started at this timing and for the placement position of the food the heating of which is not to be started at this timing. For example, the controller 204 controls the light emission of the placement-position presenter 206 to represent, with a solid line, a guide mark indicating the placement position of the food the heating of which is to be started and to represent, with a dashed line, a guide mark indicating the placement position of the food the heating of which is not to be started. The controller 204 does not necessarily have to present the placement position of the food the heating of which is not to be started at this timing.

In step S53, when the foods are placed at the presented placement positions, and the start button is pressed, the foods are heated with the set heating intensity for the set heating time.

Next, in step S54, based on the combined setting information received by the communicator 203, the controller 204 determines whether or not there is a food the heating of which has not been started. If there is no food the heating of which has not been started (NO in step S54), the processing is finished when the current food heating is completed. If there is a food the heating of which has not been started (YES in step S54), the process proceeds to step S55.

In step S55, based on the combined setting information received by the communicator 203, the controller 204 determines whether or not the food the heating of which has not been started among the foods is to be further put into the microwave oven 2. This determination is executed during the heating of the food the heating of which was started in step S53.

In this case, since the combined setting information indicates the timing at which the food is to be further put into the microwave oven 2, the controller 204 determines the timing at which the food is put into the microwave oven 2. If it is determined that the food is not to be further put into the microwave oven 2 (NO in step S55), the processing stands by until the timing at which the food is to be put into the microwave oven 2 is reached. If it is determined that the food is to be further put into the microwave oven 2 (YES in step S55), the process proceeds to step S56.

Next, in step S56, in order to enable the user to further put the food into the microwave oven 2, the controller 204 stops the food heating operation of the heater 205.

Next, in step S57, based on the combined setting information, the controller 204 controls the placement-position presenter 206 to present, to the user, the placement position of the food the heating of which is to be started at this timing. For example, the controller 204 represents, with a solid line, a guide mark indicating the placement position of the food the heating of which is to be started.

Next, in step S58, when the food is placed at the presented placement position, and the start button is pressed again, the foods are heated with the set heating intensity for the set heating time.

Next, in step S59, the controller 204 determines whether or not the heating of all of the foods has been started. If the heating of all of the foods has been started (YES in step S59), the processing is finished when the current food heating is completed. If the heating of all of the foods has not been started (NO in step S59), the processes in steps S55 to S59 are repeated.

Although the above description has been given of a case in which the setting-information generator 103 in the server 1 generates the combined setting information, and the combined setting information is transmitted to the communicator 203 in the microwave oven 2 via the communicator 101, pieces of setting information corresponding to the respective foods may be transmitted without generating the combined setting information. In this case, the controller 204 may generate the combined setting information, based on the pieces of setting information received by the communicator 203.

The generation of the combined setting information will be described next. A specific description will be given of a case in which the communicator 101 in the server 1 receives, from the communicator 203 in the microwave oven 2, the appliance ID of the microwave oven 2 and pieces of food information for a food A and a food B. The pieces of setting information for the food A and the food B are identified with the appliance ID of the microwave oven 2 and the pieces of food information for the food A and food B.

In this case, the setting information about the food A is assumed to include information indicating that the electric power is 500 watts (W), the heating time is 240 seconds, and the placement position is A. Also, the setting information about the food B is assumed to include information indicating that the electric power is 500 W, the heating time is 180 seconds, and the placement position is B. According to the two pieces of setting information, if the heating of the food A and the heating of the food B are started at the same time, and the food A and the food B are heated for 240 seconds with an electric power of 500 W, the food B will be heated for a period of time exceeding the appropriate heating time. Accordingly, the two pieces of setting information are combined to generate combined setting information indicating that the food A is to be heated for 60 seconds, which is a difference between the heating time for the food A and the heating time for the food B, and then the food A and the food B are to be heated for 180 seconds. In addition, the placement position A and the placement position B are compared with each other, and when the placement position A and the placement position B are the same or partly overlap each other, the placement position of the food A and the placement position of the food B are changed to a placement position A' and a placement position B', respectively, so that the placement positions do not overlap each other, and the placement position A' and the placement position B' are included in the combined setting information.

Based on the combined setting information, the microwave oven 2 first presents the placement position A' of the food A to the user, and when the food A is placed at the placement position A', and the start button of the microwave oven 2 is pressed, the food A is heated with an electric power of 500 W for 60 seconds. Thereafter, when the heating for 60 seconds is completed, the heating operation is stopped. Thereafter, the microwave oven 2 presents the placement position B' of the food B to the user, and when the food B is placed at the placement position B', and the start button is pressed again, heating is executed with an electric power of 500 W for 180 seconds.

Although, in the above description, the combined setting information is generated so that the food A is heated for a longer period time corresponding to the difference between the heating time included in the setting information for the food A and the heating time included in the setting information for the food B, the heating time may be increased by a predetermined multiplication factor, considering a reduction in the efficiency of heating the plurality of foods at the same time. In the above-described example, the multiplication factor for the heating time when the plurality of foods is heated at the same time may be set to 1.25 to generate the combined setting information indicating that the food A is heated for 60 seconds and the food A and the food B are heated for 225 seconds.

Figure 4:
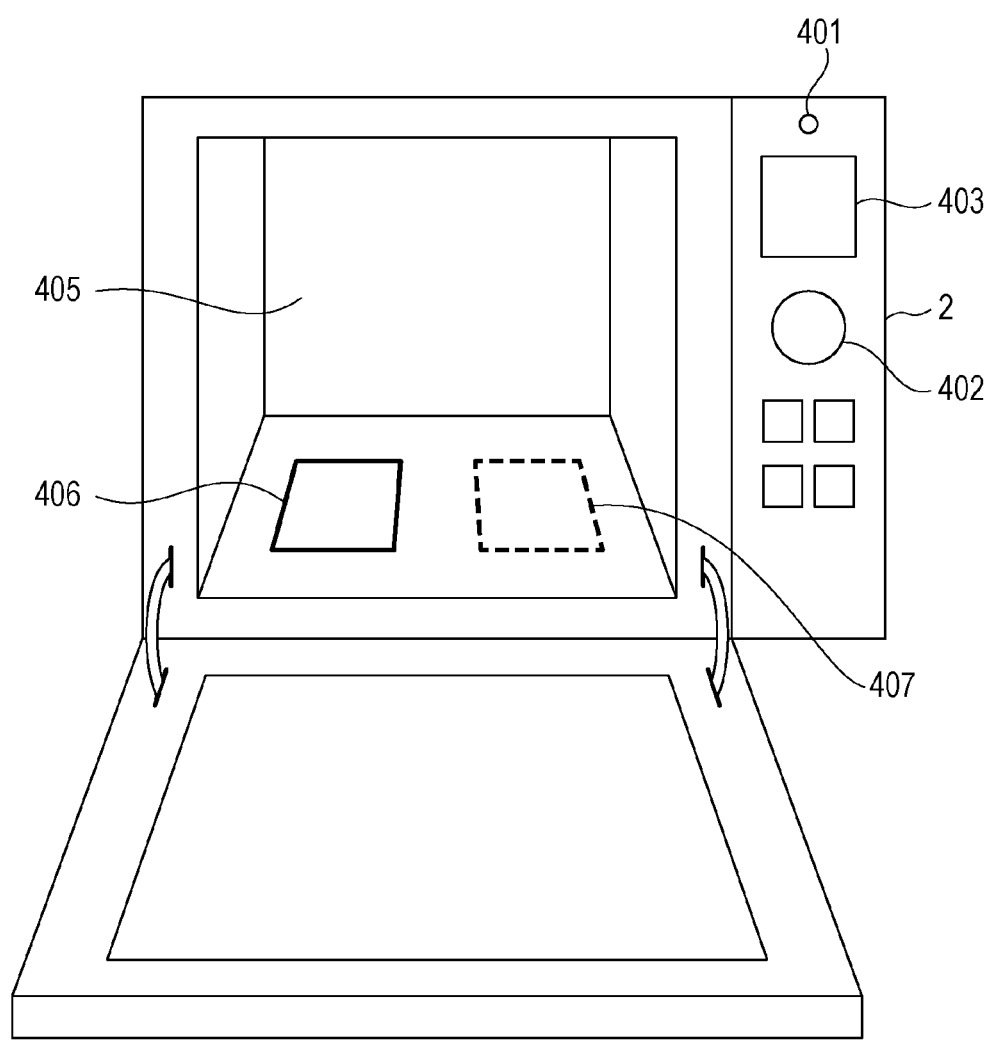
FIG. 4 is a view for describing a plurality of food placement positions to be presented to the user.

FIG. 4 is a view for describing a plurality of food placement positions to be presented to the user.

When the heating intensity and the heating time for the first food and the heating intensity and the heating time for the second food are the same, the controller 204 causes the light emitters to emit light to simultaneously form a first guide mark 406 indicating the placement position of the first food and a second guide mark 407 indicating the placement position of the second food. At this point in time, the user places the first food on the first guide mark 406, places the second food on the second guide mark 407, and presses the start button 402.

The first guide mark 406 and the second guide mark 407 are formed by modes of light that are different from each other. For example, the first guide mark 406 is represented by a solid line, and the second guide mark 407 is represented by a dashed line. The first guide mark 406 and the second guide mark 407 may have shapes corresponding to the shape of the first food and the shape of the second food, respectively.

Also, when the heating intensity for the first food and the heating intensity for the second food differ from each other, the controller 204 causes the light emitters to emit light to simultaneously form the first guide mark 406 indicating the placement position of the first food and the second guide mark 407 indicating the placement position of the second food. At this point in time, the user places only the first food on the first guide mark 406 and presses the start button 402. In this case, the first food is heated with a heating intensity corresponding to the heating intensity for the first food. After the heating of the first food is finished, the user removes the first food, places only the second food on the second guide mark 407, and presses the start button 402. In this case, the second food is heated with a heating intensity corresponding to the heating intensity for the second food. When the heating intensity for the first food and the heating intensity for the second food differ from each other, the first food and the second food cannot be heated at the same time, and thus the first food and the second food are heated at different timings, as described above.

When the heating intensity for the first food and the heating intensity for the second food are the same, and the heating time for the first food is longer than the heating time for the second food, the controller 204 causes the light emitters to emit light to simultaneously form the first guide mark 406 indicating the placement position of the first food and the second guide mark 407 indicating the placement position of the second food. At this point in time, the user places only the first food on the first guide mark 406 and presses the start button 402. When the time corresponding to the difference between the heating time for the first food and the heating time for the second food passes, the controller 204 suspends the heating and also outputs an alarm sound to notify the user that the time at which the heating of the second food is to be started is reached. The user places the second food on the second guide mark 407 and presses the start button 402. Thereafter, when the heating time for the second food passes, the heating of the first food and the heating of the second food finish at the same time.

In this case, it is desirable that the first guide mark indicating the placement position of the first food the heating of which is to be started first and the second guide mark indicating the placement position of the second food the heating of which is to be started next be formed by modes of light that are different from each other. For example, the first guide mark and the second guide mark may have shapes different from each other, and the first guide mark and the second guide mark may have colors different from each other.

As described above, when the heating times for two foods differ from each other, the food for which the heating time is longer is first heated, and during the heating of this food, the other food for which the heating time is shorter is placed, and then the two foods are heated at the same time. Thus, when the heating times for two foods differ from each other, the heating of one of the foods is started before the heating of the other food is finished, thus making it possible to reduce the time from when the heating of the two foods is started until the heating thereof is finished.

In addition, although, in the present embodiment, the food information includes a package image resulting from image capture of each food package, and cooking setting details associated with the package image and the appliance ID are obtained, the present disclosure is not particularly limited thereto. The food information may also include a package image resulting from image capture of each food package to which characters are written by the user. In this case, the user may write the name of a food and the heating time for the food to the food package. The setting-information generator 103 recognizes the characters included in the package image and identifies the name of the food and the heating time for the food. The setting-information generator 103 obtains a heating intensity and a placement position associated with the identified food name and the appliance ID and generates setting information including the obtained heating intensity and placement position and the identified heating time.

For example, the user writes "rice, oven, 3 minutes" to a piece of wrap in which rice is wrapped and captures an image of the wrap by using a camera. In this case, the setting-information generator 103 recognizes the characters included in the package image to determine that the name of the food is rice and the heating time for the food is 3 minutes. The setting-information generator 103 then obtains the heating intensity and the placement position associated with the name of the food and the appliance ID and generates setting information including the obtained heating intensity and placement position and the heating time. The controller 204 in the microwave oven 2 sets the heating intensity and the heating time according to the setting information and also presents the placement position to the user.

As described above, the cooking setting details of the microwave oven 2, the details being shown on a food package, are obtained through character recognition, and the microwave oven 2 is controlled based on the obtained cooking setting details. Thus, without having to set the heating time and so on for the microwave oven 2, the user can easily set the microwave oven 2 by directly writing the cooking setting details to a food package.

In step S3 illustrated in FIG. 2, the microwave oven 2 transmits the food information and the appliance ID to the server 1, as described above, and during the transmission, when the microwave oven 2 transmits a food image as the food information (such a case is described in step S1), the setting-information generator 103 may manage (store), in the storage 104 in the server 1, an image management table in which the received image and the food identified in step S5 are associated with each other. When corresponding data is stored in the image management table, the communicator 101 may transmit the food image, together with the setting information, again in step S7.

In addition, when the microwave oven 2 has a display unit, the display unit may display the image received in step S8, the food identified in step S5, and the setting information generated in step S6. During the display, the setting-information generator 103 may determine whether or not the food identified in step S5 is a food identified for the first time by the microwave oven 2 corresponding to the appliance ID, and only upon determining the food identified in step S5 is a food identified for the first time, the setting-information generator 103 may perform processing for storing, in the image management table, the food image and the identified food in association with each other. On the other hand, upon determining that the identified food is not a food identified for the first time, that is, the identified food is a food identified for the second or more time, in step S7, the setting-information generator 103 may transmit the image for the food stored in the image management table without storing data in the image management table.

This scheme provides a more comprehensive system for the user, since the image of the identified food and the setting information are displayed together on the microwave oven. In addition, if false recognition occurs, the user can also check whether or not the quality of the obtained food information (image) is low. Also, according to this scheme, a system designer or a service provider, such as a microwave oven manufacturer or a server administrator, does not have to pre-create and store images for foods for display.

Although, in the present embodiment, the microwave oven has been described as one example of the cooking apparatus, the present disclosure is not particularly limited thereto, and a refrigerator may be one example of the cooking apparatus. In this case, the setting information includes a placement position that is optimum for a food in the refrigerator and a refrigerator temperature that is optimum for preserving the food. The controller in the refrigerator presents the placement position of the food in the refrigerator to a user and also sets a temperature at the placement position. The setting information may include information regarding an air-flow direction.

Although, in the present embodiment, the microwave oven 2 has the input unit 201, the present disclosure is not particularly limited thereto. For example, an input unit of an information terminal, such as a smartphone or a tablet computer, may obtain the food information (barcode information, two-dimensional barcode information, or a package image). In this case, the information terminal transmits the obtained food information and a pre-stored appliance ID of the microwave oven 2 to the server 1.

Second Embodiment

Figure 5:
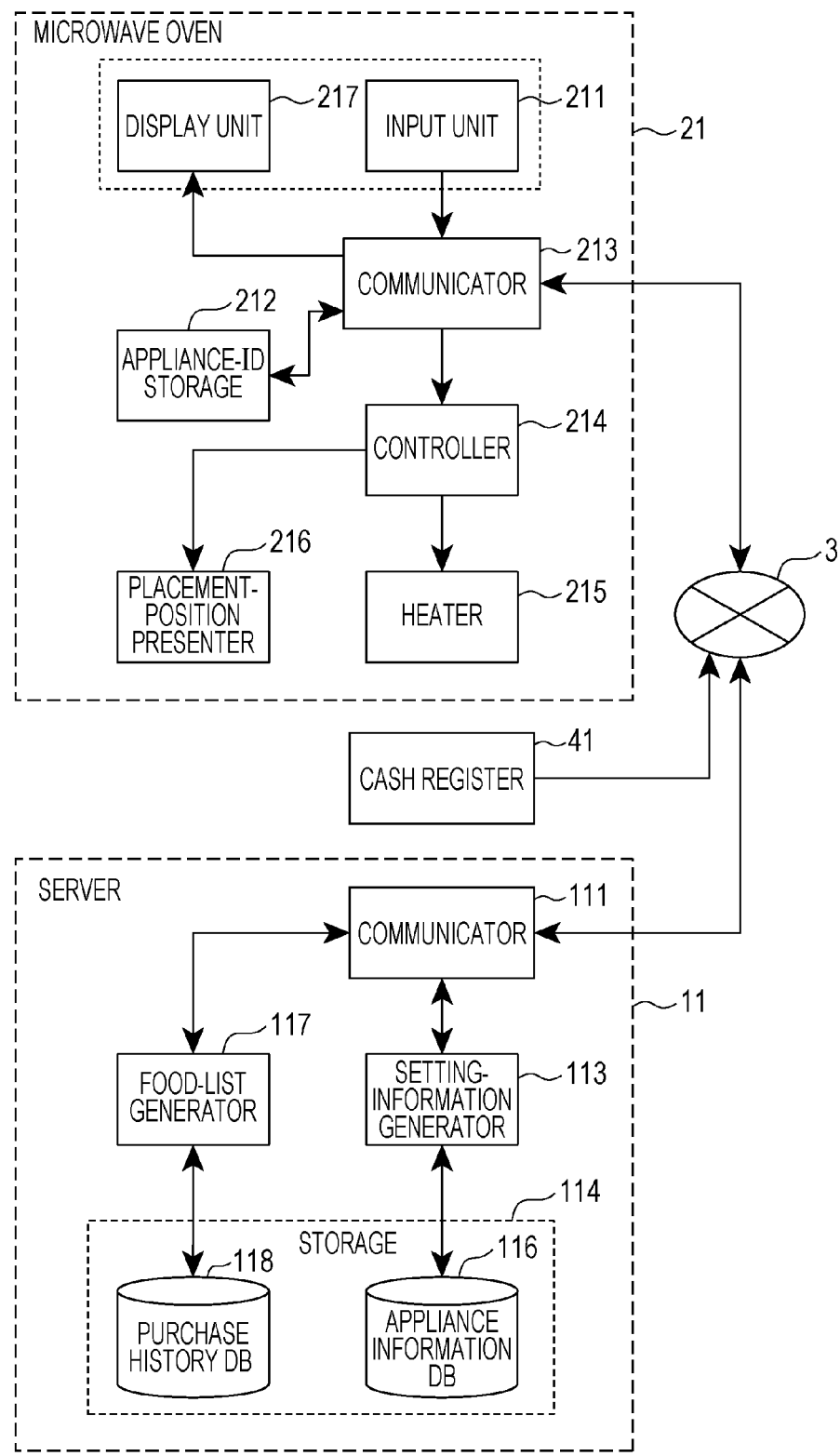
FIG. 5 is a diagram illustrating the configuration of a cooking assistance system according to a second embodiment of the present disclosure.

FIG. 5 is a diagram illustrating the configuration of a cooking assistance system according to a second embodiment of the present disclosure. The cooking assistance system illustrated in FIG. 5 includes a server 11, a microwave oven 21, and a cash register 41. The server 11 and the microwave oven 21 are connected to each other through a network 3 so as to allow communication with each other. The server 11 and the cash register 41 are connected to each other through the network 3 so as to allow communication with each other. The network 3 is, for example, the Internet. The microwave oven 21 is one example of the cooking apparatus for cooking food.

The server 11 includes a communicator 111, a setting-information generator 113, a storage 114, and a food-list generator 117. The storage 114 includes an appliance information database (DB) 116 and a purchase history database (DB) 118.

The cash register 41 is installed at a store that sells one or more foods. The cash register 41 is, for example, a point-of-sale (POS) register. The cash register 41 transmits, to the server 11, food identification information for uniquely identifying one or more foods, the information being obtained at the time of purchase of the one or more foods, and a user ID (user identification information) for identifying a user who purchased the one or more foods. For example, a reading device (scanner) reads a barcode attached to a food to thereby obtain the food identification information. A reading device (a camera) may read a two-dimensional code or color code attached to each food to thereby obtain the food identification information. The user ID is input at the time of purchase of one or more foods.

The communicator 111 transmits various types of information to the microwave oven 21 and also receives various types of information from the microwave oven 21 or the cash register 41. The communicator 111 receives, from the cash register 41, the food identification information, which is obtained at the time of purchase of one or more foods by the cash register 41 installed at the store that sells one or more foods and which uniquely identifies one or more foods, and the user ID for identifying the user who purchased the one or more foods. The communicator 111 receives, from the microwave oven 21, a food list request for requesting a food list, which is a list of foods purchased by the user, and the user ID for identifying the user. The communicator 111 receives food selection information indicating which food the user selected from the displayed food list and the appliance ID for identifying the microwave oven 21.

The food-list generator 117 associates the food identification information and user ID received by the communicator 111 and stores the associated food identification information and user ID in the purchase history DB 118. When the food list request is received, the food-list generator 117 obtains, from the purchase history DB 118, the food identification information corresponding to the user ID and generates a food list based on the obtained food identification information. The food list is a list of foods purchased by the user, as described above. The food-list generator 117 obtains the food identification information stored after the food list was generated last time. The communicator 111 transmits the food list generated by the food-list generator 117 to a source that transmitted the food list request.

The setting-information generator 113 obtains, from the appliance information DB 116, the cooking setting details of the microwave oven 21 which are associated with a food indicated by the food selection information received by the communicator 111 and the received appliance ID and generates setting information indicating the obtained cooking setting details.

Foods, the appliance ID, and the cooking setting details of the microwave oven 21 are stored in a tabular form in the appliance information DB 116 in association with each other. The setting information includes information regarding the placement position of the food in the heating chamber in the microwave oven 21. The setting information may also include information regarding the heating intensity for the microwave oven 21. In addition, the setting information may include information regarding the heating time for the microwave oven 21.

The communicator 111 transmits the setting information generated by the setting-information generator 113 to the microwave oven 21.

The microwave oven 21 includes an input unit 211, an appliance-ID storage 212, a communicator 213, a controller 214, a heater 215, a placement-position presenter 216, and a display unit 217.

The input unit 211 includes, for example, a touch panel and receives an input of a food list request for requesting a food list, which is a list of foods purchased by the user, and an input of a user ID for identifying the user.

The appliance-ID storage 212 stores therein the appliance ID for identifying the microwave oven 21.

The communicator 213 transmits various types of information to the server 11 and also receives various types of information from the server 11. The communicator 213 transmits, to the server 11, the food list request and user ID input via the input unit 211. The communicator 213 receives the food list transmitted by the server 11.

The display unit 217 includes, for example, a touch panel and displays the food list received by the communicator 213. The display unit 217 may display, of foods included in the received food list, a food list including only foods that can be cooked by the microwave oven 21. The input unit 211 receives a food that the user selected from the food list, displayed on the display unit 217, as a food to be cooked using the microwave oven 21.

The communicator 213 transmits food selection information indicating the food that the user selected from the displayed food list and the appliance ID for identifying the microwave oven 21. The communicator 213 also receives, from the server 11, the setting information indicating the cooking setting details of the microwave oven 21 which are associated with the food that the user selected from the food list and the appliance ID.

Based on the setting information received by the communicator 213, the controller 214 controls the microwave oven 21.

the heater 215 includes, for example, a magnetron, which generates microwaves to heat a food placed in the heating chamber. Based on the setting information, the controller 214 controls a heating intensity and a heating time for the heater 215.

the placement-position presenter 216 includes, for example, a light emitter disposed in the heating chamber in the microwave oven 21. By emitting light, the placement-position presenter 216 presents the position of a food to be placed in the heating chamber to the user. For example, a light emitter, such as an LED, is embedded in a top surface of a heating chamber in the microwave oven 21 to illuminate a food placement position on the bottom surface of the heating chamber. Based on the setting information, the controller 214 controls light emission of the placement-position presenter 216.

Although, in the present embodiment, the microwave oven 21 transmits the food list request and the user ID, the present disclosure is not particularly limited thereto. For example, an information terminal, such as a smartphone or a tablet computer, may transmit the food list request and the user ID. In addition, although, in the present embodiment, the microwave oven 21 receives and displays the food list, and the microwave oven 21 transmits the food selection information and the appliance ID to the server 11, the present disclosure is not particularly limited thereto. For example, an information terminal, such as a smartphone or a tablet computer, may receive and display the food list, and the information terminal may transmit the food selection information and the appliance ID to the server 11.

Now, a description will be given of the operation of the cooking assistance system according to the second embodiment of the present disclosure.

Figure 6:
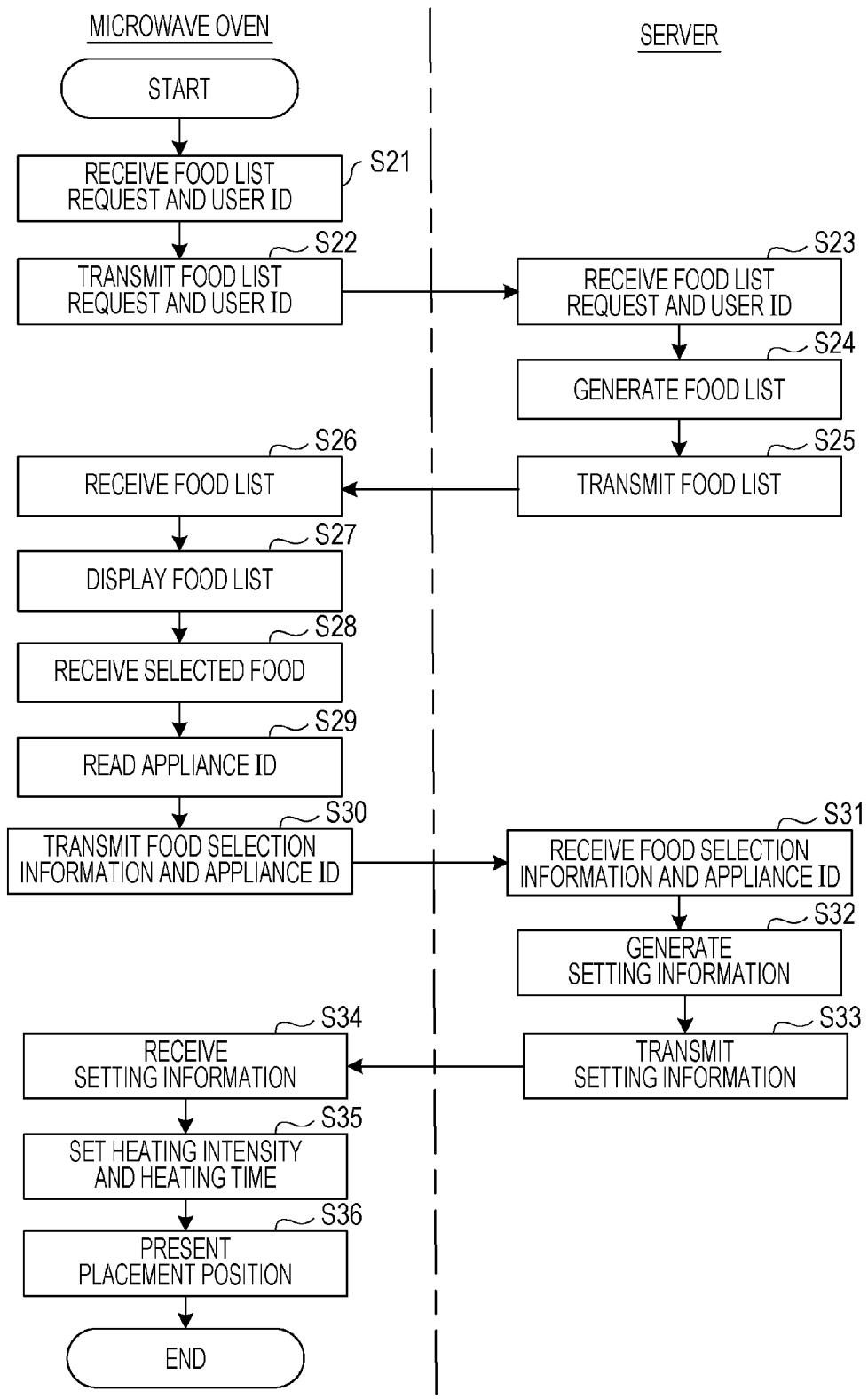
FIG. 6 is a flowchart illustrating the operation of the cooking assistance system according to the second embodiment of the present disclosure.

FIG. 6 is a flowchart illustrating the operation of the cooking assistance system according to the second embodiment of the present disclosure.

First, in step S21, the input unit 211 in the microwave oven 21 receives a food list request and a user ID input by the user. In this case, by receiving the user's operation on an operation button, the input unit 211 may receive the food list request and the user ID input by the user. Also, the input unit 211 may detect whether or not a door of the microwave oven 21 is opened, and when the door of the microwave oven 21 is opened, the input unit 211 may instruct the communicator 213 so as to transmit the food list request and the user ID.

Next, in step S22, the communicator 213 transmits the food list request and the user ID to the server 11. Without receiving the user's operation, the communicator 213 may transmit the food list request and the user ID to the server 11 at predetermined time intervals.

Next, in step S23, the communicator 111 in the server 11 receives the food list request and user ID transmitted by the microwave oven 21.

Next, in step S24, the food-list generator 117 obtains, from the purchase history DB 118, food identification information corresponding to the user ID and generates a food list based on the obtained food identification information.

The food-list generator 117 may obtain food identification information corresponding to only foods that can be cooked by the microwave oven 21 and may generate a food list based on the obtained food identification information. In this case, the communicator 111 receives the food list request, the user ID, and the appliance ID from the microwave oven 21. The food identification information, the user ID, and the appliance ID may also be stored in the purchase history DB 118 in association with each other. The food-list generator 117 obtains the food identification information associated with the received user ID and appliance ID.

Next, in step S25, the communicator 111 transmits the food list generated by the food-list generator 117 to the microwave oven 21.

Next, in step S26, the communicator 213 in the microwave oven 21 receives the food list transmitted by the server 11.

Next, in step S27, the display unit 217 displays the food list received by the communicator 213.

Next, in step S28, the input unit 211 receives a food that the user selected from the food list, displayed on the display unit 217, as a food to be cooked using the microwave oven 21.

Next, in step S29, the communicator 213 reads the appliance ID from the appliance-ID storage 212.

Next, in step S30, the communicator 213 transmits, to the server 11, food selection information indicating the food that the user selected from the displayed food list and the read appliance ID.

Next, in step S31, the communicator 111 in the server 11 receives the food selection information and appliance ID transmitted by the microwave oven 21.

Next, in step S32, the setting-information generator 113 obtains, from the appliance information DB 116, the cooking setting details of the microwave oven 2 which are associated with the food indicated by the food selection information received by the communicator 111 and the appliance ID received by the communicator 111 and generates setting information indicating the obtained cooking setting details. The setting information in this case includes a heating intensity and a heating time when the microwave oven 21 heats the food and the food placement position in the heating chamber in the microwave oven 21. For example, the bottom surface of the heating chamber in the microwave oven 21 is virtually divided into a plurality of areas, and the placement position indicates, of the virtually divided areas, the area in which the food is placed.

Next, in step S33, the communicator 111 transmits the setting information generated by the setting-information generator 113 to the microwave oven 21.

Next, in step S34, the communicator 213 in the microwave oven 21 receives the setting information transmitted by the server 11.

Next, in step S35, based on the setting information received by the communicator 213, the controller 214 sets a heating intensity and a heating time for the heater 215.

Next, in step S36, based on the setting information received by the communicator 213, the controller 214 controls light emission of the placement-position presenter 216 to present a food placement position to the user. A method for presenting the placement position in the second embodiment is the same as or similar to that in the first embodiment. When the food is placed at the presented placement position, and the start button is pressed, the food is heated with the set heating intensity for the set heating time.

Since the food identification information for uniquely identifying one or more foods at the time of purchase of one or more foods and the user ID are stored in the purchase history DB 118 in association with each other, as described above, foods purchased by the user can be managed as a purchase history.

Also, since the food list, which is a list of foods purchased by the user, is generated, and the generated food list is transmitted to a source that transmitted the food list request, the food list can be presented to the user, and the user can easily select a food to be cooked from the food list.

In addition, since the food selection information indicating the food that the user selected from the displayed food and the appliance ID for identifying the microwave oven 21 are received, and the cooking setting details of the microwave oven 21 which are associated with the food indicated by the received food selection information and the received appliance ID are obtained, it is possible to reliably execute cooking setting corresponding to the food selected by the user.

As described above in the first embodiment, when the image management table is stored in the storage 114, in step S25, the communicator 111 may transmit images of foods in the food list in conjunction with the food list. In the second embodiment, when the image management table is stored in the storage 114, the cash register 41 may have an image acquirer, and images acquired by the image acquirer of the cash register 41 may be stored in the image management table. In this case, at the time of purchase of a food, the cash register 41 captures an image of the food, while obtaining the food identification information. The communicator 111 in the server 11 receives the image, captured by the cash register 41, together with the food identification information. The received image is stored in the purchase history DB 118 in conjunction with the food list.

Figure 7:
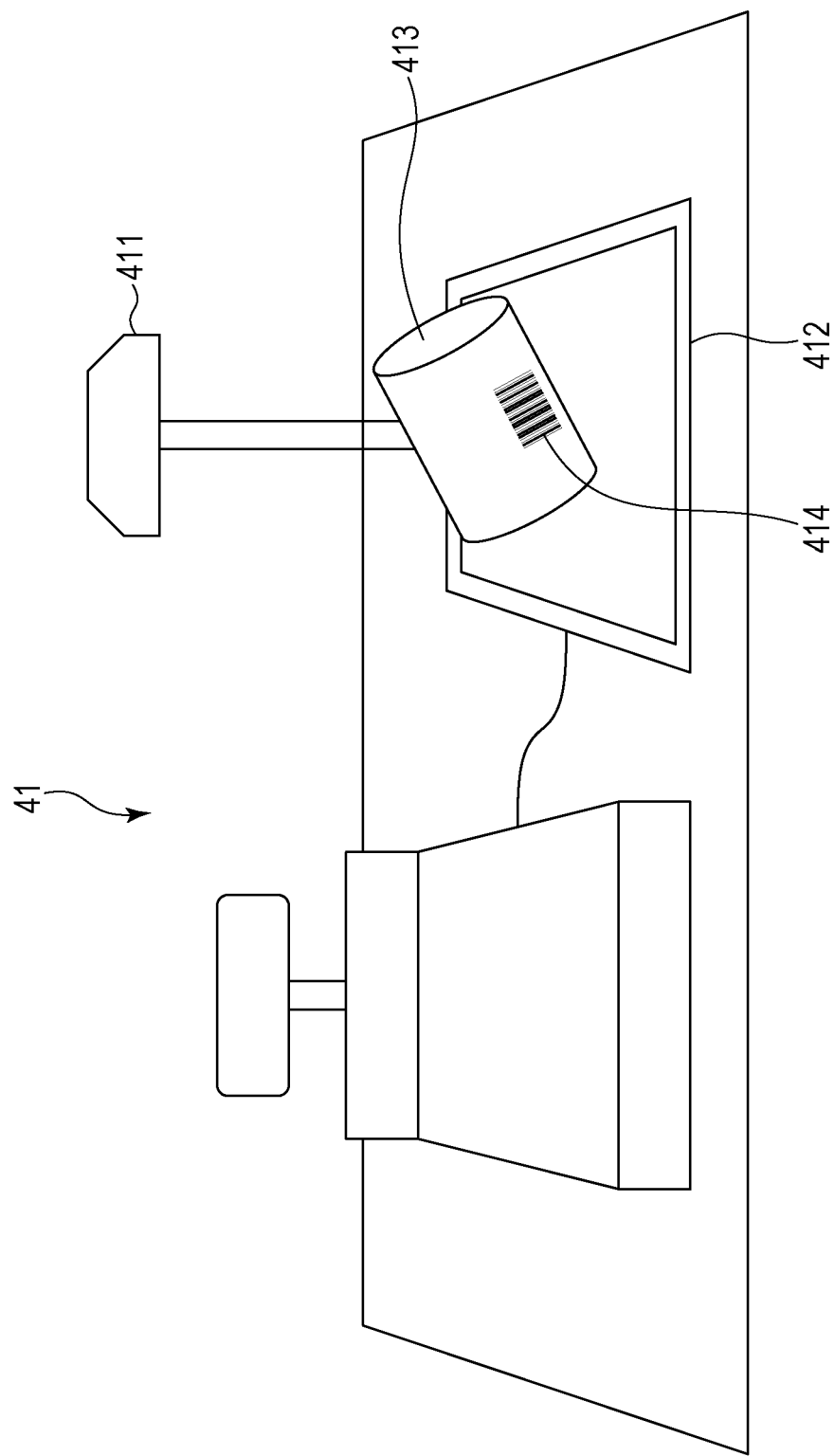
FIG. 7 is a view of an external appearance of a cash register that captures an image of a food in the second embodiment.

FIG. 7 is a view of an external appearance of the cash register that captures an image of a food in the second embodiment. FIG. 8 illustrates one example of food images stored in the purchase history DB.

As illustrated in FIG. 7, the cash register 41 has an image acquirer (a camera) 411 and a barcode scanner 412. When the barcode scanner 412 reads a barcode 414 attached to a food 413, the image acquirer 411 captures an image of the food 413 at the same time. As illustrated in FIG. 8, the food image captured by the cash register 41 may be managed in association with the identified food and/or a food code. The "food code" as used herein refers to a code associated with the corresponding food. In FIG. 8, food codes, food names, and food images are associated with each other.

Third Embodiment

A cooking assistance system in a third embodiment is a cooking assistance system obtained by combining the first embodiment and the second embodiment.

Figure 9:
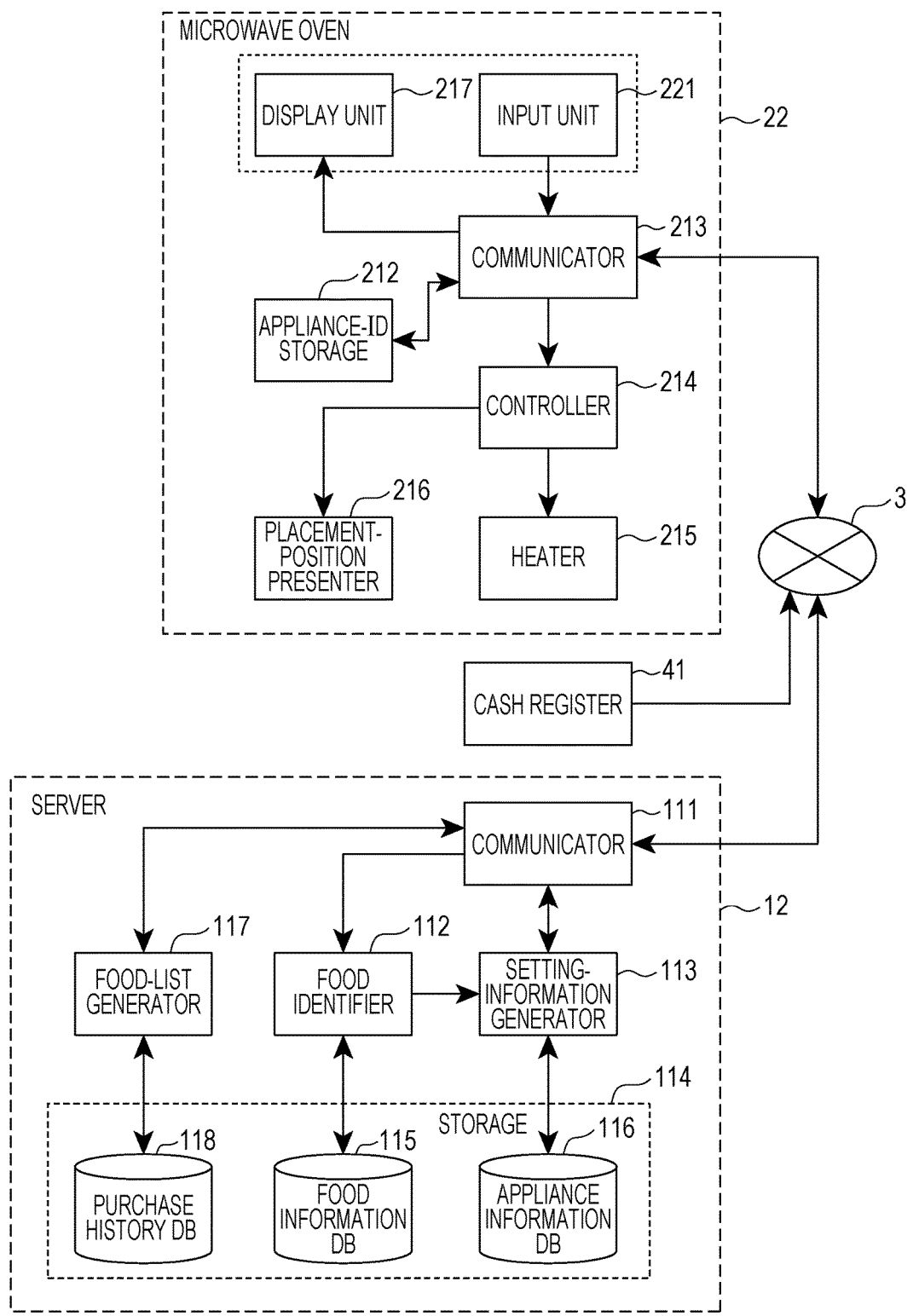
FIG. 9 is a diagram illustrating the configuration of a cooking assistance system according to a third embodiment of the present disclosure.

FIG. 9 is a diagram illustrating the configuration of the cooking assistance system according to the third embodiment of the present disclosure. The cooking assistance system illustrated in FIG. 9 includes a server 12, a microwave oven 22, and a cash register 41. The server 12 and the microwave oven 22 are connected to each other through a network 3 so as to allow communication with each other. The server 12 and the cash register 41 are connected to each other through the network 3 so as to allow communication with each other. The network 3 is, for example, the Internet. The microwave oven 22 is one example of the cooking apparatus for cooking food.

The server 12 includes a communicator 111, a food identifier 112, a setting-information generator 113, a storage 114, and a food-list generator 117. The storage 114 includes a food information database (DB) 115, an appliance information database (DB) 116, and a purchase history database (DB) 118. In the third embodiment, constituent elements that are the same as or similar to those in the second embodiment are denoted by the same reference numerals, and descriptions thereof are not given hereinafter.

The communicator 111 receives food information obtained from a food to be used in the microwave oven 22, which assists cooking, and an appliance ID for identifying the microwave oven 22.

Based on the received food information, the food identifier 112 uniquely identifies the food. The food identifier 112 identifies not only the type of food but also the manufacturing company and the product name of the food.

The food information and the food are stored in a tabular form in the food information DB 115 in association with each other. For example, a reading device (a scanner) reads a barcode attached to each food to thereby obtain the food information. In this case, the food information DB 115 stores therein a table in which barcode information read by a scanner and corresponding foods are associated with each other, and the food identifier 112 uniquely identifies each food associated with the corresponding barcode information, based on the food information DB 115.

A reading device (a camera) may read a two-dimensional code or color code attached to each food to thereby obtain the food information. In this case, the food information DB 115 stores therein a table in which two-dimensional code information or color code information read by the camera and corresponding foods are associated with each other, and the food identifier 112 uniquely identifies each food associated with the corresponding two-dimensional code information or the color code information, based on the food information DB 115.

Also, a reading device (a camera) may capture an image of the package of a food to thereby obtain the food information. In this case, the food information DB 115 stores therein a table in which package images captured by the camera and corresponding foods are associated with each other, and the food identifier 112 uniquely identifies each food associated with the corresponding package image, based on the food information DB 115.

The setting-information generator 113 obtains, from the appliance information DB 116, cooking setting details of the microwave oven 22 which are associated with the food indicated by the food selection information received by the communicator 111 and the received appliance ID and generates setting information indicating the obtained cooking setting details.

The setting-information generator 113 also obtains, from the appliance information DB 116, cooking setting details of the microwave oven 22 which are associated with the food identified by the food identifier 112 and the appliance ID received by the communicator 111 and generates setting information indicating the obtained cooking setting details.

The communicator 111 transmits the setting information generated by the setting-information generator 113 to the microwave oven 22.

The communicator 111 receives, from the cash register 41, the food identification information, which is obtained at the time of purchase of one or more foods by the cash register 41 installed at a store that sells one or more foods and which uniquely identifies one or more foods, and the user ID for identifying a user who purchased the one or more foods. The communicator 111 receives a food list request for requesting a food list, which is a list of foods purchased by the user, and the user ID for identifying the user. The communicator 111 receives food selection information indicating which food the user selected from the displayed food list and the appliance ID for identifying the microwave oven 22.

The setting-information generator 113 determines whether or not the food indicated by the food selection information received by the communicator 111 and the food identified by the food identifier 112 match each other. Upon determining that both the foods match each other, the setting-information generator 113 obtains the cooking setting details of the microwave oven 22 which are associated with the food identified by the food identifier 112 and the appliance ID received by the communicator 111. On the other hand, when both the foods do not match each other, the setting-information generator 113 obtains the cooking setting details of the microwave oven 22 which are associated with the food indicated by the food selection information received by the communicator 111 and the appliance ID received by the communicator 111. Also, upon determining that both the foods do not match each other, the setting-information generator 113 corrects the food associated with the food information in the table in which the food information and unique foods are associated with each other, the table being stored in the food information DB 115, to the food indicated by the received food selection information.

The microwave oven 22 includes an input unit 221, an appliance-ID storage 212, a communicator 213, a controller 214, a heater 215, a placement-position presenter 216, and a display unit 217.

The input unit 221 includes, for example, a touch panel and receives an input of a food list request for requesting a food list, which is a list of foods purchased by the user, and an input of a user ID for identifying the user.

The input unit 221 also obtains food information from a food. The input unit 221 includes, for example, a barcode scanner to read a barcode attached to a surface (package) of a food and obtains the read barcode information as the food information.

The input unit 221 may include, for example, a camera to read a two-dimensional code or color code attached to a surface (package) of a food and obtains the read two-dimensional code information or color code information as the food information.

The input unit 221 may also include, for example, a camera to capture an image of a surface (package) of a food and may obtain the captured package image as the food information.

The communicator 213 transmits, to the server 12, the food information obtained by the input unit 221 and the appliance ID read from the appliance-ID storage 212. The communicator 213 may also receive, from the server 12, the setting information indicating the cooking setting details of the microwave oven 22 which are associated with the appliance ID and the food uniquely identified based on the food information.

Thus, when the food uniquely identified based on the food information and the food that the user selected from the food list differ from each other, the food selected by the user is correct, and thus the cooking setting details of the cooking apparatus which are associated with the food indicated by the food selection information and the appliance identification information are obtained. This makes it possible to reliably obtain the cooking setting details of the cooking apparatus.

Also, when it is determined that the food uniquely identified based on the food information and the food that the user selected from the food list do not match each other, the table in which the food information and the unique foods are associated with each other is corrected based on the food indicated by the received food selection information. This makes it possible to correct an error in the table in which the food information and the unique foods are associated with each other and makes it possible to improve the accuracy of identifying a food.

The cooking assistance method and the cooking apparatus according to the present disclosure can easily and reliably realize cooking setting corresponding to a food and are useful for a cooking assistance method for assisting food cooking and a cooking apparatus for cooking food.

What is claimed is:

1. A cooking assistance method for a cooking assistance system, the cooking assistance system including a processor and being connected through a network to a cooking apparatus, the cooking apparatus for cooking food, the cooking assistance method comprising:
    receiving, in association with a first food, first food information indicating the first food;
    receiving appliance identification information for identifying the cooking apparatus for cooking the first food;
    obtaining first setting details regarding cooking to be performed by the cooking apparatus, based on the received first food information and the received appliance identification information, the first setting details being associated with the first food and the cooking apparatus; and
    transmitting first setting information indicating the obtained first setting details to the cooking apparatus,
    wherein the cooking apparatus includes a heater and a heating chamber,
    the first setting information includes information regarding a placement position of the first food in the heating chamber of the cooking apparatus,
    the first setting information is configured to cause the cooking apparatus to present the placement position of the first food to a user, based on the information regarding the placement position, and
    the first setting information is configured to cause the cooking apparatus to present the placement position of the first food to the user via a light emitter disposed in the heating chamber of the cooking apparatus, the light emitter being caused to emit light to present the placement position to the user.

2. The cooking assistance method according to claim 1, wherein the first food comprises a processed food.

3. The cooking assistance method according to claim 1, wherein the first setting information includes information regarding a heating intensity for the heater.

4. The cooking assistance method according to claim 1, wherein the cooking assistance system is further connected to a device configured to read information indicated by barcodes, and
the device reads a barcode attached to the first food.

5. The cooking assistance method according to claim 4, wherein the device comprises a two-dimensional-code reading device or a color-code reading device, and
the barcode attached to the first food is a two-dimensional code or a color code.

6. The cooking assistance method according to claim 1, wherein the first food information includes image information indicating an image obtained by photographing an external appearance of the first food.

7. The cooking assistance method according to claim 6, wherein the first food information includes character information indicating a character shown on the first food.

8. The cooking assistance method according to claim 1, wherein the cooking assistance system is further connected through the network to a point-of-sale device installed at a store that sells one or more foods; and
the first food information is obtained by the point-of-sale device when the first food is purchased, and is received from the point-of-sale device through the network.

9. The cooking assistance method according to claim 8, wherein the cooking assistance system further comprises a display and a memory that stores a food list including the one or more foods, and
the cooking assistance method further comprises:
    displaying the food list on the display;
    receiving second food information indicating a second food that the user selected from the displayed food list;
    determining whether or not the received second food information and the first food information match;
    obtaining the first setting details when it is determined that the first food information and the second food information match;
    obtaining second setting details regarding cooking performed by the cooking apparatus, when it is determined that the first food information and the second food information do not match, the second setting details being associated with the second food and the appliance identification information; and
    transmitting second setting information indicating the obtained second setting details to the cooking apparatus.

10. The cooking assistance method according to claim 9, wherein the memory further stores a table in which the first food is associated with the first food information and the second food is associated with the second food information, and
the cooking assistance method further comprises correcting the first food associated with the first food information in the table to the second food, when it is determined that the first food information and the second food information do not match.

11. The cooking assistance method according to claim 1, further comprising:
    receiving, in association with a second food, second food information indicating the second food, in conjunction with the first food information;
    obtaining second setting details regarding cooking to be performed by the cooking apparatus, based on the received second food information and the received appliance identification information, the second setting details being associated with the second food and the cooking apparatus; and
    transmitting second setting information indicating the second setting details to the cooking apparatus, in conjunction with the first setting information.

12. The cooking assistance method according to claim 11, wherein
the second setting information includes second information regarding a second placement position of the second food in the heating chamber of the cooking apparatus, and
the second setting information is configured to cause the cooking apparatus to present the second placement position to the user, based on the second information regarding the second placement position.

13. The cooking assistance method according to claim 11, wherein
the first setting information includes information indicating a first heating time for the first food in the heating chamber of the cooking apparatus,
the second setting information includes information indicating a second heating time for the second food in the heating chamber of the cooking apparatus, and
when the first setting information is compared with the second setting information, and the first heating time is shorter than the second heating time, the first setting information and the second setting information include notification information for causing the cooking apparatus to prompt placement of the first food into the cooking apparatus during cooking of the second food by the cooking apparatus.

14. A cooking apparatus for cooking food, the cooking apparatus comprising:
    a device that obtains, in association with a food, food information indicating the food;
    a storage that stores appliance identification information for identifying the cooking apparatus;
    a transmitter that transmits the obtained food information and the appliance identification information to a server;
    a receiver that receives setting information from the server, based on the food information and the appliance identification information, the setting information being associated with the food and the cooking apparatus and indicating setting details regarding cooking to be performed by the cooking apparatus; and
    a controller that controls the cooking apparatus, based on the setting information,
wherein the cooking apparatus includes a heating chamber, a heater, and a light emitter disposed in the heating chamber,
the first setting information includes information regarding a placement position of the first food in the heating chamber of the cooking apparatus,
the placement position of the first food is presented to a user, based on the information regarding the placement position, and
the placement position of the first food is presented to the user via the light emitter disposed in the heating chamber of the cooking apparatus.

15. The cooking assistance method according to claim 1, further comprising:
    receiving, in association with a second food, second food information indicating the second food;
    obtaining second setting details regarding cooking to be performed by the cooking apparatus, based on the received second food information and the received appliance identification information, the second setting details being associated with the second food and the cooking apparatus; and transmitting second setting information indicating the obtained second setting details to the cooking apparatus, wherein the first setting information and the second setting information are configured to cause the cooking apparatus to simultaneously present the placement position of the first food to the user via the light emitter and present a second placement position of the second food to the user via the light emitter, and the light emitter includes a plurality of light emitters.

16. The cooking assistance method according to claim 15, wherein the first setting information and the second setting information are configured to cause presentation of the placement position and the second placement position via different modes of light.

17. The cooking assistance method according to claim 1, wherein the first setting information includes information regarding a shape of a guide mark to be presented at the placement position, the shape of the guide mark corresponding to a shape of a bottom surface of the first food.

18. The cooking assistance method according to claim 1, wherein the first setting information includes a heating intensity and a heating time for the first food in the cooking apparatus, the heating intensity and the heating time being automatically set for the cooking apparatus.

* * * * *